United States Patent [19]

Martelli et al.

[11] Patent Number: 4,669,969

[45] Date of Patent: Jun. 2, 1987

[54] APPARATUS FOR INTERNALLY EMBOSSING TRAYS FORMED FROM A FOIL OF FOAMED PLASTICS BY A CONTINUOUS HOT-MOLDING MACHINE

[75] Inventors: Nerio Martelli, Bologna; Alvaro Ottaviani, Imola; Pierluigi Sabba, Ferrara, all of Italy

[73] Assignee: NESPAK S.p.A., Societa Generale per l'Imballagio, Ravenna, Italy

[21] Appl. No.: 816,856

[22] Filed: Jan. 7, 1986

[30] Foreign Application Priority Data

Jan. 25, 1985 [IT] Italy ............................. 12414 A/85

[51] Int. Cl.⁴ ............................................ B29C 17/04
[52] U.S. Cl. ................................. 425/388; 425/405 R
[58] Field of Search ................... 425/219, 388, 405 R, 425/504

[56] References Cited

U.S. PATENT DOCUMENTS

| | | | |
|---|---|---|---|
| 2,297,504 | 9/1942 | Salvaneschi | 425/405 R X |
| 3,488,413 | 1/1970 | Watts, Jr. | 425/405 R X |
| 3,577,594 | 5/1971 | Al-Roy | 425/388 X |
| 4,284,396 | 8/1981 | Thissen et al. | 425/388 X |
| 4,397,804 | 8/1983 | Medwed | 425/388 X |
| 4,515,546 | 5/1985 | Medwed | 425/388 X |
| 4,521,175 | 6/1985 | Medwed | 425/388 X |

*Primary Examiner*—Robert Spitzer
*Attorney, Agent, or Firm*—Larson and Taylor

[57] ABSTRACT

This invention relates to an apparatus for embossing hot molded plastic foil which comprises one or more banks of multiple embossing elements mounted on a rotatable wheel operated in cooperation with a hot-molding machine supporting multiple mold cavities. The embossing surface of each element has a curvilinear lateral profile and rotates around the wheel axis in a direction opposite to the rotation of the drum of the hot-molding machine in a manner synchronized to the rotation of the drum so that each embossing surface meshes with a corresponding mold, pressure embossing the hot plastic form molded therein. The peripheral speeds of the mating surfaces of embossing element and mold, as well as the embossing pressure, are controlled by interlocking the respective drive mechanisms, plus suitable elastic means, so that no slippage can occur in the mold cavity upon contact between the surfaces at high rotational speeds.

12 Claims, 11 Drawing Figures

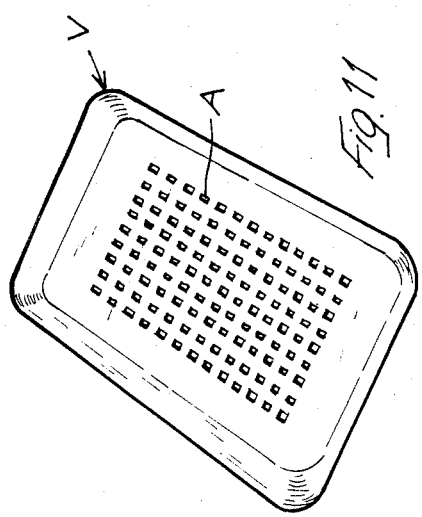
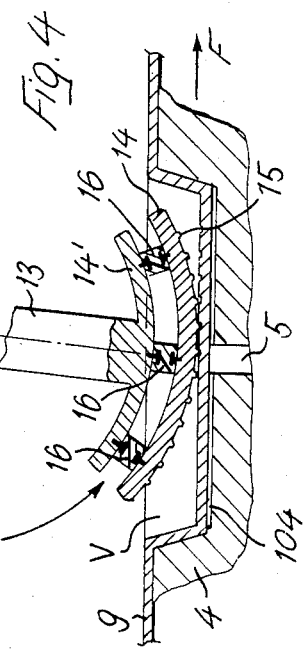
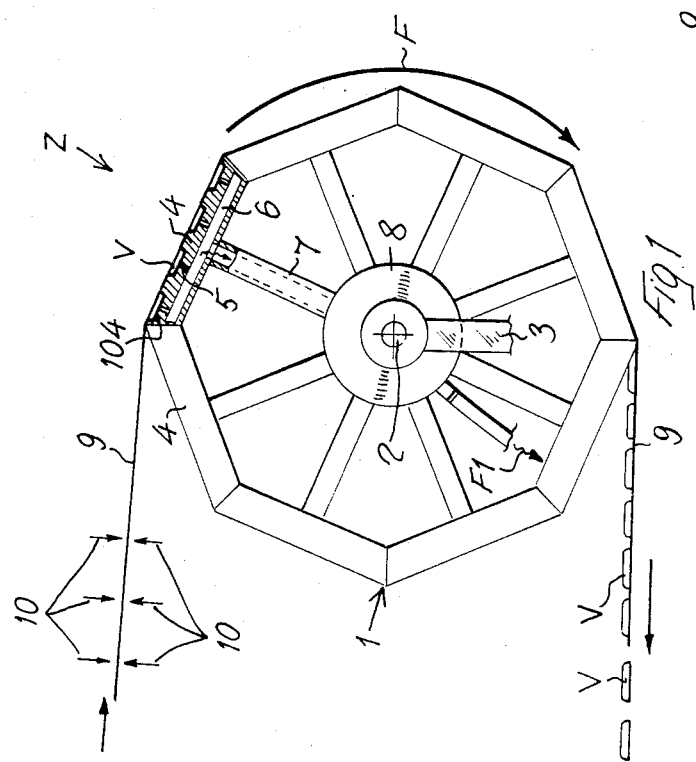

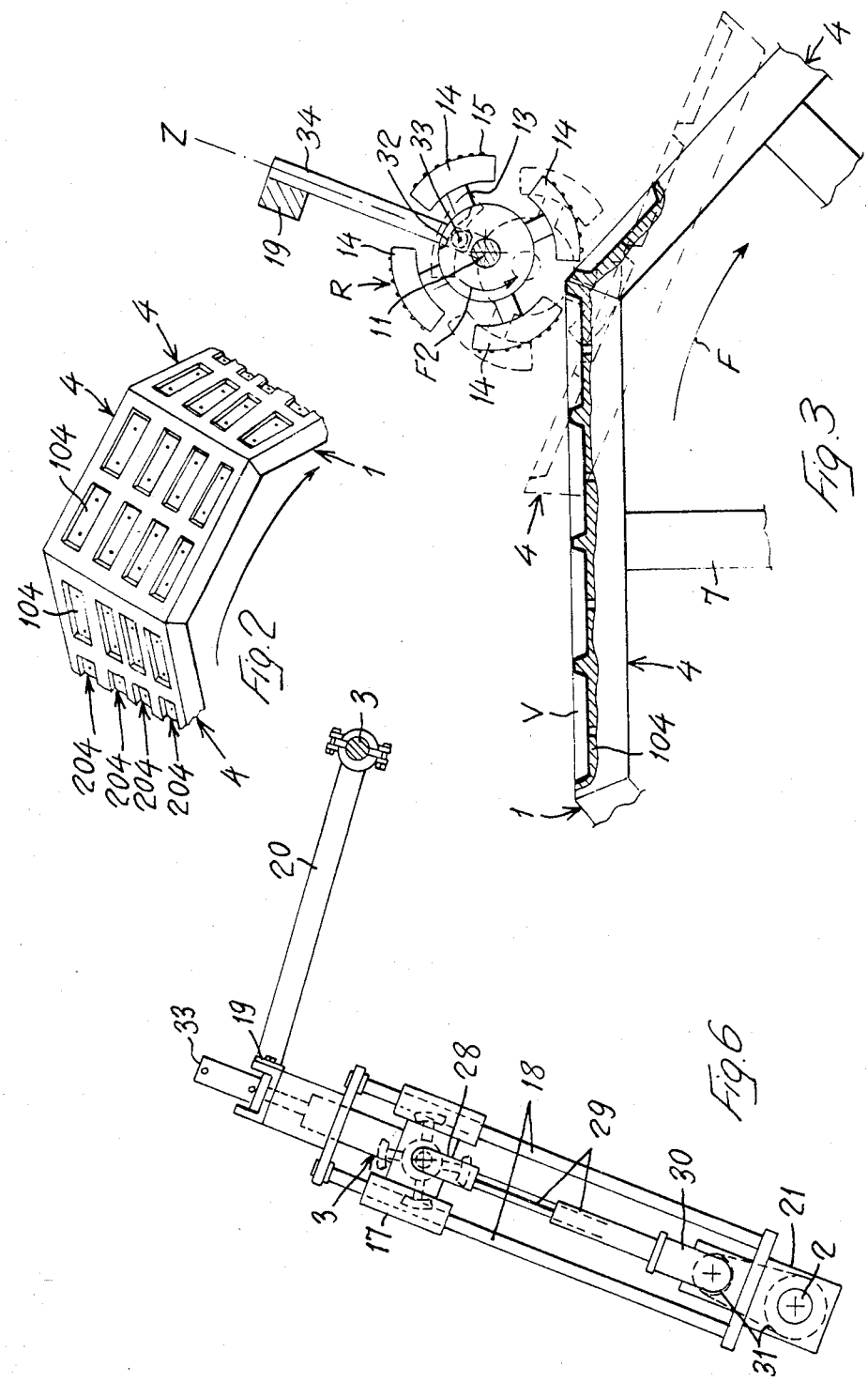

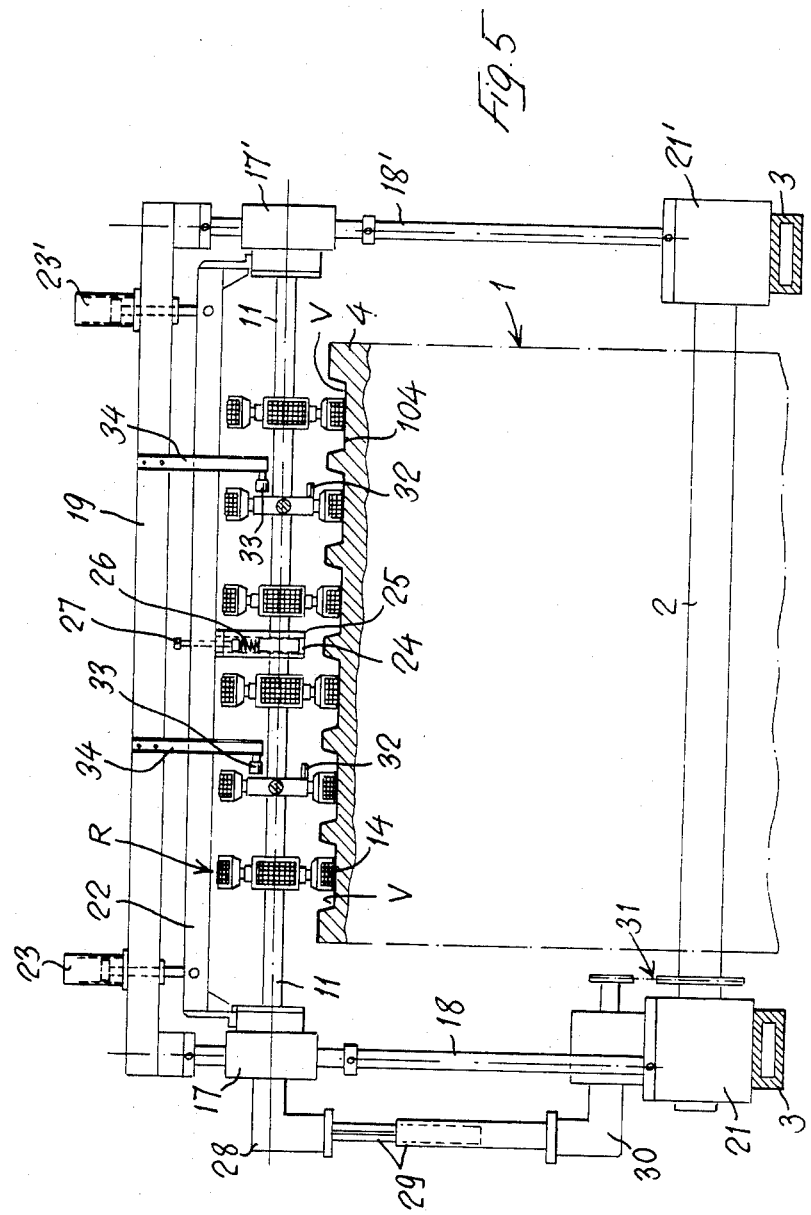

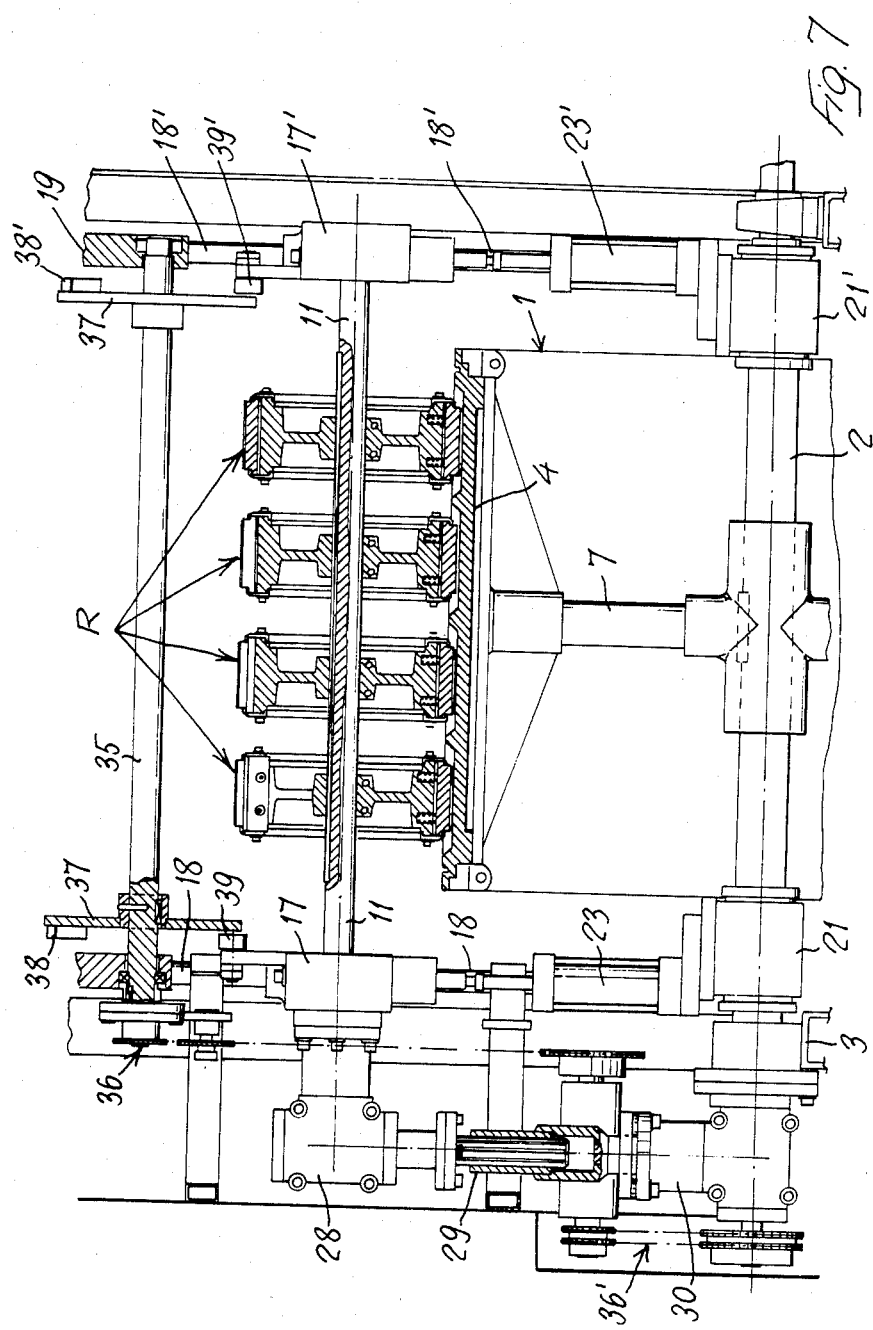

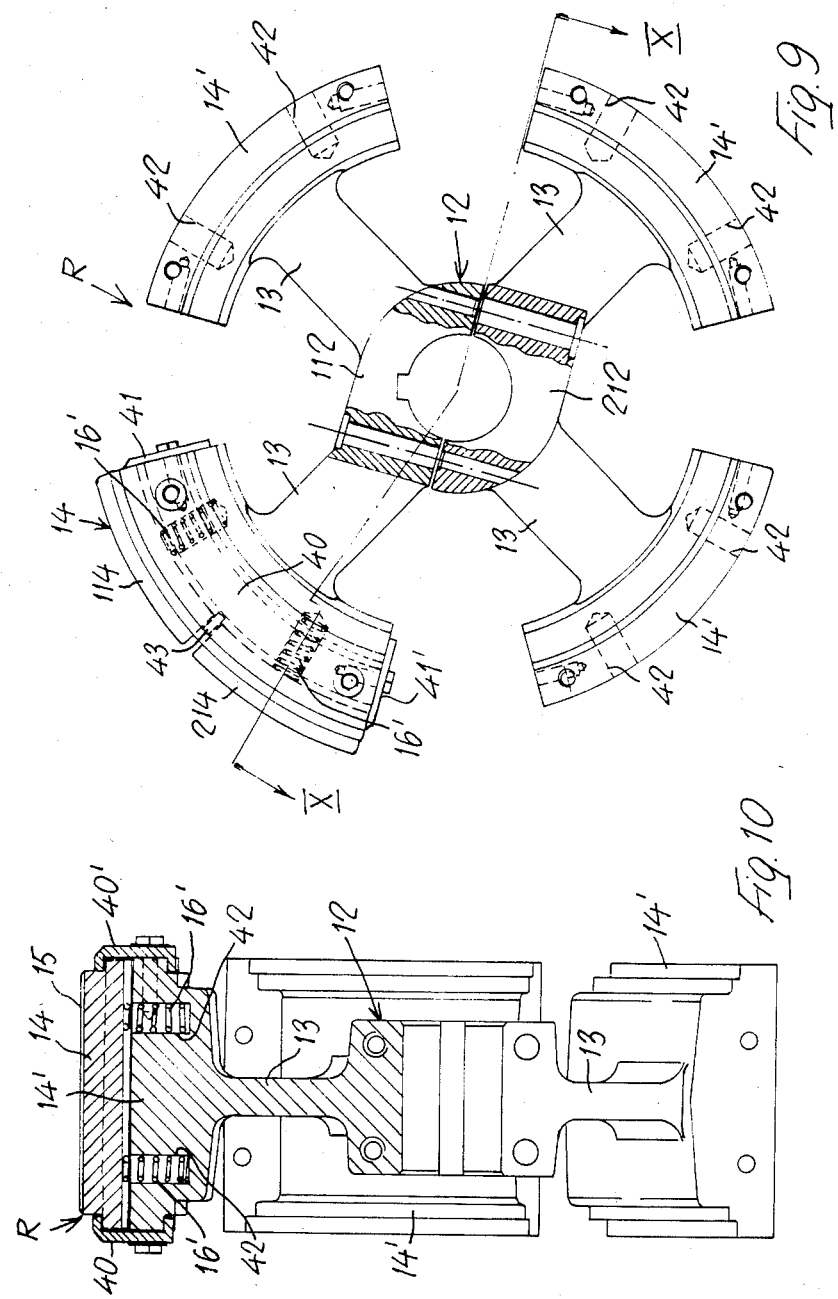

APPARATUS FOR INTERNALLY EMBOSSING TRAYS FORMED FROM A FOIL OF FOAMED PLASTICS BY A CONTINUOUS HOT-MOLDING MACHINE

SUMMARY OF THE INVENTION

This invention relates to an apparatus for embossing the inner surface of trays or of any other article of a relatively limited depth, formed from a foil of foamed plastics by a continuous hot-molding machine, particularly of the rotary type.

The apparatus of the invention is characterized by the following features:
- it is of relatively simple construction;
- it operates with a continuous rotary motion, and acts upon the bottom walls of the trays directly upon their molding, without limiting the productive capacity of the molding machine to which it is applied;
- it requires a very low embossing pressure;
- when the molds are changed, it can be easily and quickly adapted to these molds.

BRIEF DESCRIPTION OF THE DRAWINGS

These and others features of the novel embossing apparatus, and the advantages arising therefrom will clearly appear from the following description of some possible embodiments thereof, shown merely by way of non-limiting examples in the six annexed sheets of drawing, in which:

FIG. 1 diagrammatically shows in side elevation and with parts in section the mold-carrying rotary drum of a continuous rotary molding machine for which the embossing apparatus of the invention has been expressly designed.

FIG. 2 is a diagrammatic perspective view of a portion of the mold-carrying drum, which shows: a multiple mold for the manufacture of the trays; the cavities of said mold; the longitudinal rows of cavities; the drum edges separating the several multiple molds from one another.

FIG. 3 is a partly sectioned side view partially showing the molding machine drum of FIG. 1, while it is cooperating with the dies of the embossing apparatus.

FIG. 4 is a partly sectioned view diagrammatically showing one possible embodiment of the embossing elements, which comprises dies or plugs, depicted in their working position.

FIGS. 5 and 6 respectively are a front elevational view and a side elevational view of the whole embossing apparatus as applied to the continuous molding machine of FIG. 1.

FIGS. 7 and 8 respectively are a front elevational view and a side elevational view, with parts in section, of a different embodiment of the embossing apparatus.

FIG. 9 is a partly sectioned side view showing one of the rotary embossing devices fitted in the apparatus according to FIGS. 7 and 8.

FIG. 10 shows further constructional details of the device of FIG. 9, sectioned on line X—X.

FIG. 11 is a perspective view showing a tray that has been internally embossed by means of apparatus of the invention.

DESCRIPTION OF THE PREFERRED EMBODIMENTS

Figure 8:
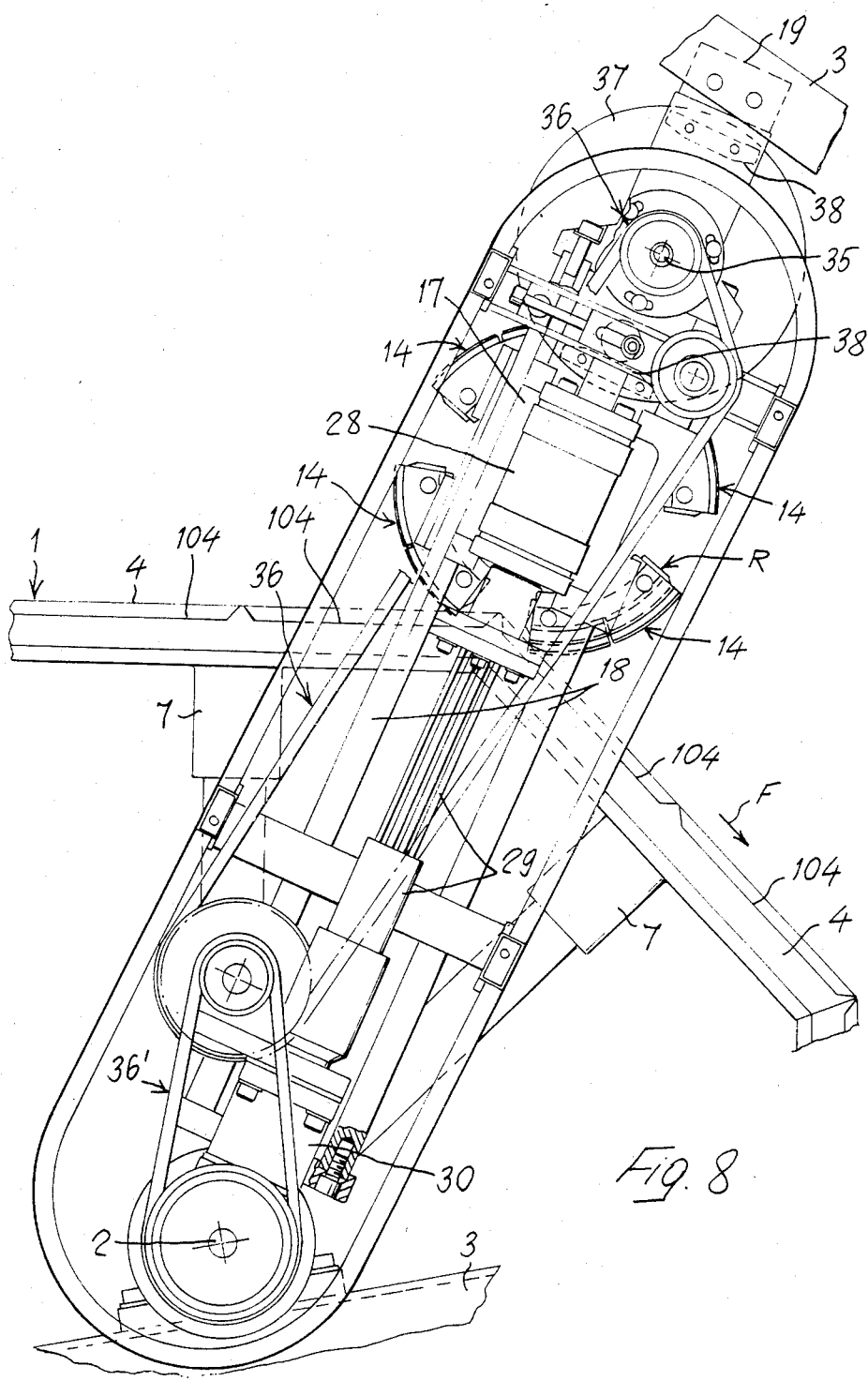

In order to better understand the intended objects of the invention, attention is drawn to FIG. 1 which diagrammatically shows the significant part of a continuous rotary machine for molding trays, of the type to which reference is made. The machine is equipped with a polygonal rotary drum 1 having its horizontal shaft 2 supported by a base frame 3, and which (through means not shown) is continuously rotated at a uniform speed in the direction indicated by arrow F. On the faces of the polygonal drum 1 multiple molds 4 are mounted the one after the other, and their seats 104 are provided with respective lower ports 5 opening into the manifolds 6 which through the hollow spokes 7 of the drum and through a rotary joint 8 can be controlled to connect to suction means (see arrow F1). The web 9 of foamed plastics which is unwound from a not shown reel, is first heated by means symbolically indicated by arrows 10, and then it is placed on drum 1 so as to cover the multiple molds 4 having their cavities 104 aligned in longitudinal parallel rows 204 (see FIG. 2). When the molds 4 are set in communication with the suction means F1, the surface of the softened plastics web adhering to the drum is sucked into the molds and takes their conformation. The conformation consists of a plurality of hollow structures possibly having wordings or reliefs in their lower convex face, while their concave upper face remains smooth. These hollow structures which are subsequently separated from the web by means of a suitable cutting device not shown in the Figure, constitute the trays V shown in FIG. 11.

When it is intended to give a particular shape also to the inner upper face of said trays and, more particularly, when it is desired to emboss their bottom walls, as shown by A in FIG. 11, for functional and/or aesthetic reasons, a particular apparatus must be combined with the hot molding.

In the rotary machines of the type shown in FIG. 1, the embossing of the bottom walls of trays V can be obtained with known means, by arranging in the station diagrammatically indicated by the arrow Z, a flat countermold provided with dies having projecting or recessed portions of the required shape, which are pressure-inserted into the seats 104 for the multiple molds 4 in order to obtain the said embossing A in the bottom walls of the trays. The embossing countermold generally is of such a size that it simultaneously affects all the seats 104 of one multiple mold 4 arranged on one face of drum 1. In order to permit a continuous rotation of drum 1, with no stopping times, the said embossing countermold is fitted on an oscillating support allowing it to follow the rotation of drum 1 over a predetermined circle arc. The said countermold is provided with means pushing The countermold against the mold. Said means subsequently disengaging the counter mold in time for the oscillating support to quickly return it into the starting position Z so that it can act upon the mold successively coming into that station.

Due to the reciprocating motion to which the countermold must be subjected as well as their rather important mass and associated inertia, the known embossing apparatus adversely affect the revolving speed of drum 1, thus limiting the output of the machine making the trays.

This invention aims to overcome these and other drawbacks by providing a newly conceived embossing apparatus of the rotary type, described as follows: FIG. 3 shows that at the station indicated by Z in FIG. 1 there is located a shaft 11 having a working length which is equal to the length of drum 1, and being arranged parallel to the shaft in FIG. 1. The shaft under consideration is supported by any suitable means allowing it to be rotated, to be drawn near to, and away from the shaft 2, while being kept constantly parallel to said shaft. This shaft 11 is urged with an appropriate pressure against the drum 1, and is rotated in the direction of arrow F2, at a speed which is properly related (see after) to the peripherical speed of drum 1. At least one disc 12 for each row 204 of seats 104 of the multiple molds 4 (FIG. 2) is keyed onto shaft 11 in correspondence with each row 204. Each one of said discs FIG. 3 supports by means of spokes 13 the elements 14, which may be dies or plugs, and are shaped like a circle arc or have a different suitable curvature (see after). These dies are of any appropriate number and are spaced apart from one another as a function of the distance between the seats 104 of each row 204. The length of curvature of the molding surface of each die 14 and the width of said surface are substantially the same as, or are somewhat shorter than the length and width of the bottom wall of each one of the trays being molded in the seats 104 of the molds 4. The dies 14 have their longitudinal median axis arranged on an ideal plane containing also the longitudinal median axis of one row 204 of cavities 104. Still referring to FIG. 3, on the outer face of the dies 14 there are provided the embossing projections and/or recesses 15 integral therewith or as one inserted piece. Therefore, onto shaft 11 there are keyed as many embossing devices of the just described type as there are longitudinal rows 204 of the longitudinal cavities 104 of the multiple molds 4. These devices are spaced apart from one another in such a manner that each one of them can act upon one of said rows 204 of cavities 104, and each die can act upon a cavity 104.

The operation of each one of the thus conceived embossing devices is simple and evident. The rotation of shaft 11 FIG. 3 and of shaft 2 of drum 1 FIG. 1 are synchronized, and are such that the assembly R FIG. 3 of embossing dies will behave like a hypothetical gear wheel in mesh with another hypothetical gear wheel formed by the molds 4 in drum 1, the teeth of the first wheel being formed by the dies 14, and the teeth of the second wheel being formed by the projecting portions between one seat 104 and the immediately successive one. While rotating in timed relation with the drum 1, the dies 14 go into the seats 104 of molds 4, and by acting with appropriate pressure upon the bottom faces of the trays molded in these seats, which faces still are in a sufficiently plastic condition, from thereon the embossing recesses and/or projections A, as shown in FIG. 11. The thus conceived apparatus, when compared with the known apparatus previously described, presents the following advantages:

it is operated with a continuous rotary motion, without any reciprocating device, so that it does not limit the productivity of the molding machine to which it is applied;

for the embossing operation, it is sufficient to give a moderate pressure to the rotary assembly R of the dies, since these dies are into contact with the bottom walls of the trays to be embossed over a small-sized area, theoretically limited to a contact line.

In order to obtain a clean embossing, it is necessary to avoid any slippage between the dies 14 and the bottom walls of the trays to be embossed. Therefore, the peripheral speed of said dies and of the rows of cavities of the multiple molds 4 must be sensibly the same at the area in which they contact one another. According to a solution that is preferred owing to its simplicity, the mold-carrying drum 1 and the assembly of the embossing dies or plugs are imparted a uniform rotary motion in opposite directions.

While the embossing dies or plugs, when they are rigidly secured to the spokes, move along a circular orbit at a uniform speed, the peripheral speed of the rows of cavities 104 of the multiple molds 4 varies from the one end to the other end of these molds, since they are located on the faces of a polygonal drum. Therefore arrangements are required in order to avoid any slippage between the dies and the trays to be embossed. The arrangements may consist of the following:

the embossing dies or plugs may be shaped not like a circle arc, but with a suitable curvilinear profile that can be determined by calculation or by testing, so that the several portions of the active surface will be imparted the same peripheral speed as the several mold areas with which they come gradually into contact;

the embossing dies 14 may be mounted in a not rigid manner on the respective supporting spokes, and means may be provided for causing these dies to be cyclically rotated along different orbits with a varying radius;

the embossing dies or plugs may be connected to the respective supports with the interposition of elastic means, which are such as to allow a movement of the dies or plugs in a direction both parallel and perpendicular to the spokes. Thus the dies self-adjust to the varying peripheral speed of the successive mold areas that they contact;

it is possible to use a combination of two or more of the aforementioned solutions.

With regard to the solution that contemplates the arrangement of elastic means between the embossing dies or the respective spokes, it should be taken into account that this solution permits a perfect self-adjustment of the dies to the bottoms of the cavities 104 of mold 4. This condition is particularly important when the mold with the appertaining cavities is formed directly by casting, which may result in an irregular shape. FIG. 4 shows how elastic means 16 can be placed between each die 14 and the respective supporting plate 14', which is integral with spokes 13. The elastic means 16 consist, for example, of rubber pads having screws included in their ends for mechanically fastening same to the elements 14—14'. According to other embodiments, springs may be provided in place of pads 16, or same results may be attained by making the spokes 13 resilient and/or of the telescopic type, or by allowing the spokes to oscillate, or else by making each die 14 in the form of a plurality of elastically loaded close sections, or else by making each die in the form of a sort of resilient bladder made as a whole of an elastic material, such as solid rubber having suitable properties, or of rubber with a fluid under pressure therein.

Referring to FIGS. 5 and 6, one possible complete embodiment of an embossing apparatus to be applied to a continuous rotary machine of the type as shown in FIG. 1 will be described. These Figures show that the rotary shaft 11 carrying the previously described embossing devices R, which are suitable keyed onto said shaft, has its ends supported on slides 17—17' which are slidable on pairs of parallel rods 18—18', which in turn are connected at their top ends by means of a cross member 19, which through bars 20 is fastened to the molding machine frame 3. At their lower ends, the pairs of rods 18—18' are integral with support members 21—21' which support the rotary shaft 2, or are mounted onto said shaft. The embossing devices thus ahve the possibility of moving relatively to shaft 2, while remaining always parallel thereto. In order to guarantee to the embossing devices the required pressure in the direction of drum 1, the slides 17—17' are connected by means of a cross member 22, which by its ends is in turn connected to the stems of two fluid pressure-operated cylinder-and-piston units 23—23' having their body fastened to the cross member 19. The units 23—23' are preferably of the double-acting type, and through a circuit, the constructional details of which are not described here, are connected to a compressed air source. In case of need, when, for example, the maintenance of the embossing dies has to be performed, or when the replacing of the molds 4 has to be carried out, the units 23—23' permit, among others, to draw the whole embossing assembly away from drum 1, and to keep same in such a position. When the shaft 11 is very long, at the intermediate section thereof there may be provided a bearing 24 (FIG. 5) which is supported by a support member sliding within a guide 25 fixed to the cross member 22, and which is loaded at the required pressure by elastic means 26 controlled by an adjusting screws 27. In order to allow the embossing devices to rotate in timed relation with drum 1, as previously disclosed, the shaft 11 is kynematically connected to the shaft 2 of said drum through a transmission which is formed by: a first angle drive 28 connected to slide 17; a driving shaft 29 of the telescopic type; a second angle drive 30 fixed to the support member 21; a drive 31 with a suitable gear ratio, formed, for example, by pinions and chains.

When the drum 1 is rotated uniformly, and when the previously described arrangements are not adopted for counterbalancing any peripheral speed difference between the cavities 104 of molds 4 and the corresponding embossing devices R to attain such an objective, an action of appropriate means is required to suitably vary the speed of rotation of shaft 11. For example a others these means may, comprise clutches, elastic couplings, or any equivalent means, in the kinematic chain connecting the shaft 11 to the shaft 2, taking into account that the kinematic chain shall be devised in such a manner as to guarantee the required synchronism between the parts R and 1, especially at the moment in which the assembly R is passing over the edges of the drum. Otherwise, provisions can be made for the embossing assembly to be imparted a variable motion which, for example, is obtainable by suitably shaping the pinion of the drive 31 keyed onto the shaft 2. It is also possible to equalize the peripheral speed of the embossing dies or plugs to that of each area of the molds with the trays to be embossed by causing chain tightening devices (not shown in the Figure), supported by elastically yielding arms, to act upon the chains connecting the pinions of the drive 31. When, due to the action of the pneumatic devices 23—23', the initial portion of a die or plug is engaged in the initial area of a mold, the above arrangement allows the embossing die or plug to rotate, equalizing its speed of rotation to the peripheral speed of a mold, as a result of the action of the chain tightening devices that permit shaft 11 to rotate at a variable speed, different from the speed of the drum shaft 2.

In order that the embossing rotary devices may easily pass from one to the other of the multiple molds 4 carried by drum 1 by going over the vertexes between successive molds, the following arrangement has been devised: two of the discs 12 which are symmetrically positioned on shaft 11 (see FIGS. 3 and 5), have their peripheral portion provided with suitably shaped respective cams 32 which are so located that when the embossing assembly R reaches the condition as shown in FIG. 3, passing one of the vertexes of drum 1, the said cams will cooperate with respective rollers 33 carried by supports 34 attached to the cross member 19. As a result of such cooperation, the devices R are conveniently lifted while passing from one mold 4 to the next one. The cams 32 are so shaped that once the embossing assembly has passed one vertex of drum 1, it will be gradually and smoothly returned into the required condition for operating on the following multiple mold 4. When the embossing assembly R has a number of dies 14 which is the same as the number of cavities 104 in one row 204 of each multiple mold 4, one cam 32 is provided on each disc 12. Whereas, when the number of the dies mounted on each embossing assembly is equal to that of the cavities of two or more successive multiple molds, (just as in the example shown in FIGS. 7 and 8), two or more angularly equispaced cams 32 should be mounted on each disc 12.

According to a modified construction of the embossing apparatus, the cylinder-and-piston units 23—23' have their bodies mounted on the support members 21—21', and have their stems acting upon the slides 17—17', as shown in FIGS. 7 and 8, to which reference is now being made. In this case, the units 23—23' are not cumbersome, as they are in the version as per FIGS. 5 and 6. The angle drive 30 can be connected directly to the shaft 2 of drum 1. Still in FIGS. 7 and 8 it is shown that the cyclic lifting of shaft 11, at the time that the embossing rotary assembly R overrides the edges of drum 1, can be achieved by arranging parallelly to the shaft 11 a rotary shaft 35 which is supported at the ends by the cross member 19, and which is kinematically connected through the positive drives 36—36' formed by pinions and chains, to the drum shaft 2. The chain tightening devices as previously mentioned may be arranged on the drives 36 and/or 36'.

Discs 37—37' are keyed onto the ends of shaft 35, and onto each one of these discs is keyed pairs of angularly equispaced cams 38—38' which by cooperating with bearings or rollers 39—39' that are associated to the slides 17—17', determine the lifting of shaft 11 whenever the embossing assembly is about to override one edge of drum 1.

The cams 38—38' have a particular profile (that can be determined by calculation or by testing) which is such that not only the overriding of a drum edge or any other projections that may be situated between the successive mold cavities 104 will be achieved, but which is also such that the distance between the embossing devices and the cavities of a multiple mold 4 can be suitably modified by shifting the orbit along which the embossing dies or plugs revolve, which shifting is determined by shifting shaft 11 relative to the drum-carrying shaft 2.

In relation to that stated above, the radius of the orbit along which the single dies or plugs revolve (and therefore their peripheral speed) can be changed. In fact, (see FIGS. 4 and 9) since elastic means are provided between the dies 14 and the relative plates 14' supporting each embossing assembly (see later on), and since the shaft 11 with the several embossing assemblies is constantly urged toward the molds by the units 23—23', the cooperation of cams 38—38' with the rollers 39—39' can produce such a different deformation of said elastic means that the distance from shaft 11 of the die portion progressively contacting a mold 4 changes in time, in such a manner that between this die portion and the mold no slippage will occur.

By changing the number of the cams 38—38' and their position on the discs 37—37', it is possible to adjust the described apparatus to the number and the shape of the seats 104 longitudinally aligned along the faces of drum 1. In this regard, reference is made to that previously disclosed for cam 32 of the solution as shown in FIGS. 5 and 6. By the solution shown in FIGS. 7 and 8, the embossing assemblies R can be mounted close to one another, as it appears in FIG. 7. The replacement of these assemblies, when the size and the arrangement of seats 104 are changed, is considerably simplified as compared to the solution of FIG. 5.

The disc 12 of each embossing device R can be divided into a plurality of parts. According to one preferred solution, shown in FIGS. 9 and 10, the disc 12 of each embossing device R is diametrically divided into two parts 112-212, so that it can be keyed onto the shaft 11 in the manner of a screw clamp. The spokes 13 carrying the plates 14' on which the embossing dies 14 are elastically mounted, are integral with each one of the parts of the disc. Each die 14 is divided into two parts 114-214, which are placed the one after the other, and are possibly held with an appropriate play on the respective plate 14' by side sections 40—40' and by end stops 41—41' respectively fastened on the sides and at the ends of said plate 14'. The two parts of each die are urged away from plate 14' by springs 16' which are partly housed in recess 42 formed in the plate itself. Between the two die parts a suitable distance washer 43 (FIG. 9) is inserted with an appropriate play. Such a division into two or more parts of each die 14 can help in the self-adjustment of the dies to the molds at the areas of mutual contact, and it can also help to avoid any slippage between an embossing device and the surface to be embossed.

It is understood that an embossing apparatus made according to the above-illustrated embodiments may be applied also to molding machines of non-rotary type, such as to machines with a rectilinear path, of the type with a longitudinally movable mold, and of the type with a stationary mold.

It is finally understood that the specification relates to some preferred embodiments of the invention, to which numerous changes and modifications may be brought. For example, the fact that the rotary embossing assembly, instead of being supported by rectilinear guides, is swingably supported by any suitable structure. According to a further constructional modification the embossing rotary dies can be used, if suitably shaped, as a rotary countermold for forcing the material 9 into the mold seats 104.

What is claimed is:

1. Apparatus for molding a foil of foamed plastics material into containers having a relatively limited depth said apparatus comprising:
   a mold having a plurality of longitudinally aligned mold cavitites,
   means for moving a foil of foamed plastics material along a feed path to said mold,
   means for molding said foil of foamed plastics material in said mold cavities into the form of a container of relatively limited depth and having a concave bottom wall,
   a wheel member for internally embossing the concave upper face of said concave bottom wall of said molded containers, said wheel member being mounted for rotation along an axis substantially perpendicular to the direction of motion of a plastics foil being moved along said feed path and substantially parallel to said feed path, said wheel member comprising a plurality of embossing members peripherally mounted on said wheel member for rotation therewith, each of said embossing members having a size not greater than a concave bottom wall of a molded container to be embossed, each of said embossing members being mounted on said wheel member such that its median lontgitudinal axis is located substantially in a vertical plane which also contains the median longitudinal axis of said plurality of longitudinally aligned mold cavities, said embossing members being spaced apart from one another along the periphery of said wheel member a distance corresponding to the distance between adjacent mold cavities of said plurality of aligned mold cavities;
   means for rotating said wheel member such that said embossing members are brought suquentially into embossing engagement with the bototm wall of molded containers in said longitudinally aligned mold cavities;
   means for urging said wheel member towards said mold such that an embossing member exerts an appropriate embossing pressure on a bottom wall of a molded tray in a mold cavity of said plurality of longitudinally aligned mold cavities; and
   means for avoiding detrimental slippage between the surface of said embossing member and the surface of a molded tray as it is embossed.

2. Apparatus according to claim 1 wherein said molding means comprises a drum mounted for rotation about a longitudinal axis substantially parallel with the axis of rotation of said wheel member, said drum being polygonal in cross section, and wherein each of said molds is located on a face of said polygonal drum, and wherein said apparatus further comprises means for rotating said polygonal drum member in a direction opposite to the direction of rotation of said wheel member.

3. Apparatus according to claim 2 wherein said detrimental slippage avoiding means comprises a shaped surface of each of said embossing members, said shaped surface having a curvilinear profile shaped so that the portions of each shaped surface will have substantially the same peripheral speed as the corresponding portions of a respective mold cavity.

4. Apparatus according to claim 2 wherein said detrimental slippage avoiding means comprises means for causing said embossing members to be cyclically rotated along different orbits with a varying radius.

5. Apparatus according to claim 2 wherein said detrimental slippage avoiding means comprises means for elastically connecting said embossing members to said wheel member to allow movement of said embossing members circumferentially and radially relative to said wheel member.

6. Apparatus according to claim 5 wherein said embossing member comprises two members elastically connected together.

7. Apparatus according to claim 2 wherein said means for rotating said drum and wheel member comprises coupling means for synchronous rotation of said drum and wheel member, and wherein said apparatus further comprises means for insuring the timed relation and the required synchronism between the movement of the mold cavities and the movement of the embossing members, whereby the peripheral speed of each embossing member and the speed of the bottom wall of a tray to be embossed, contained in the corresponding mold cavity of a mold, will be substantially the same at the contact area, and therefore the said embossing members will rotate with no detrimental slippage with respect to the said bottom walls of the trays to be embossed.

8. Apparatus according to claim 7, further comprising wheel member moving means for causing the wheel member to be drawn near to or away from the mold-carrying drum while being kept always parallel thereto, so as to shift the orbit along which the embossing members revolve, thus drawing them near to, or away from the molds, and allowing the embossing members to override the vertices of the mold-carrying polygonal drum.

9. Apparatus according to claim 8 wherein said wheel member moving means comprises cam means, and wherein said apparatus further comprises means for rotating said cam means synchronously with rotation of said drum member and wherein each wheel member comprises a number of embossing members equal to the number of mold cavities in each of said molds.

10. Apparatus according to claim 2 wherein said apparatus further comprises means for rotating said drum member and said wheel member at constant rotational velocity.

11. Apparatus according to claim 2 wherein said apparatus comprises means for rotating said drum members at a constant rotational velocity and wherein said detrimental slippage avoidance means comprises means for varying the rotational speed of said embossing members.

12. Apparatus according to claim 1 wherein said embossing members comprise male dies.

* * * * *